(12) United States Patent
Toledano et al.

(10) Patent No.: US 8,566,713 B2
(45) Date of Patent: Oct. 22, 2013

(54) DATA TRANSFER METHOD AND SYSTEM

(75) Inventors: Eyal Toledano, Kiryat Ata (IL); Reuben Bareli, Herzliya (IL); Dan Shirron, Givaat Ada (IL); Elad Haviv, Zurit (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 851 days.

(21) Appl. No.: 12/544,315

(22) Filed: Aug. 20, 2009

(65) Prior Publication Data

US 2011/0047458 A1    Feb. 24, 2011

(51) Int. Cl.
 *G06F 3/00*    (2006.01)
(52) U.S. Cl.
 USPC .......................................................... 715/273
(58) Field of Classification Search
 USPC .................... 715/234, 243, 254, 255, 273
 See application file for complete search history.

(56) References Cited

U.S. PATENT DOCUMENTS

| | | | | |
|---|---|---|---|---|
| 2004/0223197 A1* | 11/2004 | Ohta et al. | ...................... | 358/538 |
| 2005/0220060 A1* | 10/2005 | Takusagawa et al. | ......... | 370/338 |
| 2009/0037897 A1* | 2/2009 | Dull et al. | ...................... | 717/168 |
| 2009/0059264 A1* | 3/2009 | Tsuji | ............................. | 358/1.13 |
| 2009/0108057 A1* | 4/2009 | Mu et al. | ....................... | 235/375 |

FOREIGN PATENT DOCUMENTS

| | | |
|---|---|---|
| EP | 2040156 | 3/2009 |
| GB | 2454482 | 5/2009 |
| WO | 2007003682 | 1/2007 |

OTHER PUBLICATIONS

The extended European search report, Dec. 9, 2010 (7 pages).
www.clip2mobile.net—printed Aug. 20, 2009—4 pages—publication date unknown.
Dynatmic Adaptation of Projected Imperceptible Codes, Anselm et al., 10 pages—publication date unknown.
SURF: Speeded Up Robust Features, Bay at al.—14 pages—publication date unknown.
http://evernote.com—printed Aug. 20, 2009—1 page—publication date unknown.

* cited by examiner

*Primary Examiner* — Kyle Stork
(74) *Attorney, Agent, or Firm* — Roach Brown McCarthy & Gruber, P.C.; Kevin D. McCarthy

(57) ABSTRACT

A method for utilizing an object in cooperation between computer apparatus and a mobile device, comprises the steps of: a) identifying an object shown on a screen associated with computing apparatus; b) determining the coordinates of said object on said screen; and c) transmitting said object and/or its metadata.

16 Claims, 19 Drawing Sheets

A

B

A

B

A

B

A

B

A

B

A

B

DATA TRANSFER METHOD AND SYSTEM

FIELD OF THE INVENTION

The present invention relates to the transfer of data between a mobile device, such as a cellular phone, and other mobile devices or personal computers, or the like non-mobile computing apparatus.

BACKGROUND OF THE INVENTION

Mobile devices are becoming increasingly integrated in the use their owner makes to replace some of the functions of heavier computer apparatus. As a result, the Abilities of small mobile devices, such as cellular telephones, have been enhanced in recent years such that they are able both to generate data, such as media files, text files, data files and other data, such as location data generated by GPS, as well as to receive and use data and data files generated by other systems. However, the art has so far failed to provide an intuitive and immediate way that enables the transfer of files or data (such as Images, Text, HTML files, URL, etc.) from a PC to a mobile device, and vice versa, in a manner that is efficient and convenient for the user. Currently, for instance, a user wishing to transfer notepad text from a PC to a mobile phone is required to perform several actions such as saving text to file, establishing connection, dragging and dropping a file, finding the file in the phone, opening the file, cutting & pasting, etc. For instance, a utility called "Clip2Mobile" (www.clip2mobile.net) allows for the clipping of information from the desktop to the cellular phone, but its use does not enable an intuitive and fast transfer of objects between devices. Moreover, it does not support the use of the camera to look at the object on a screen and extract it to the other device.

Throughout this description, unless otherwise specified, the terms "mobile device" and "mobile phone" are used interchangeably to refer to communication devices that, in addition to their communication capabilities are also equipped with computing capabilities, which allows them to generate data that can be used by a PC, or use data generated by a different system, such as a PC, or both.

Furthermore, for the purposes of this description the terms "PC", "personal computer", "computing apparatus", "desktop computer" or the like, are used to indicate computing equipment and systems in the broadest sense, and include laptop computers, fixed or mobile terminals, screens equipped with computing capabilities, and any data handling equipment equipped with a CPU and communication capabilities.

According to the known art different software is provided to facilitate data transfer between mobile communication devices and a PC. Illustrative examples of such software include Samsung PC Studio, Microsoft Active Sync and BT connection. Also, products are available, which offer a degree of synchronization between a cellular phone and the PC. An example of such products is Evernote (http://evernote.com), which enables to upload material (pictures taken, SMS, documents, etc.) to a server, where it indexes the features and then synchronizes the material with all the devices.

All the methods and systems available in the prior art suffer from drawbacks inasmuch as they are time-consuming, cumbersome to use and do not provide an intuitive, easy to use, immediate transfer solution, which enables the transfer of files or data from PC to mobile phone and vice versa.

It is a purpose of the present invention to provide a method and system that overcome the drawbacks of the prior art in which provide a simple, intuitive and fast transfer of objects, including but not limited to files and data, between mobile devices and PCs.

Other purposes and advantages of the invention will become apparent as the description proceeds.

SUMMARY OF THE INVENTION

In one aspect the invention is directed to a method for utilizing an object in cooperation between computer apparatus and a mobile device, comprising the steps of:
    identifying an object shown on a screen associated with computing apparatus;
    determining the coordinates of said object on said screen; and
    transmitting said object and/or its metadata.

In one embodiment of the invention method further comprises performing an operation associated with said object once the transfer has been effected.

The object can be of any suitable type and is, for instance, selected from data objects, executable objects, file folders and/or their metadata.

The object and its coordinates can be identified using a variety of methods. For instance, they can be identified using optical apparatus, or using a pointing device associated with a screen, or using a combination of optical apparatus and pointing device, or in any other suitable manner.

The object can be of any suitable type and typically includes data or data combination. Illustrative examples of suitable objects are those which include—but are not limited to—an image, text, media files, or are associated with a software installation process.

In another aspect the invention is directed to a method for transferring data objects between computer apparatus and a mobile device, comprising the steps of:
    pointing a mobile device at an object shown on a screen associated with computing apparatus;
    determining the coordinates of said object on said screen;
    identifying the object at which the mobile device was pointed, using said coordinates;
    transmitting a data object.

In one embodiment of the invention the object shown on the screen is an object to be transmitted to a mobile device, and the transmitting step includes creating in the computing apparatus a transmissible data object and transmitting the same to the mobile device.

According to one embodiment of the invention determining the coordinates is performed by processing an image of the screen, which has been acquired by the camera of the mobile device.

In a particular embodiment of the invention the object shown on the screen is representative of a storage area on the computing apparatus or associated with it, to which data object existing on the mobile device is to be copied or transferred.

The invention also encompasses a system for transferring data objects between computer apparatus and a mobile device, comprising:
    a data object extractor provided in the computing apparatus or associated with it, to extract data objects identified by their location on a screen associated with said computing apparatus;
    an image processor provided in the mobile device, the process images of a screen and to extract location information for objects appearing on said screen therefrom; and an application service processor provided on the mobile device, to receive data objects transmitted over a communication line and to embed them in the operation of said mobile device;

wherein said computing apparatus and said mobile device communicates over a communication line suitable to transfer data objects.

The communication line suitable for use in the system can be of any suitable kind and, for instance, is selected from one or more of Bluetooth, WiFi, USB cable and cellular network.

DETAILED DESCRIPTION OF THE INVENTION

The invention provides an immediate, user friendly solution for the transfer of data from a PC or other mobile device to a mobile phone and vice versa. The system of the invention, when operating to transfer data from a PC to a mobile phone, operates as follows:

a) The user points the mobile phone's camera at the object on the PC screen, which he wants to use on the mobile phone;

b) The user presses a key (for example) on the mobile phone that activates a program, which identifies what the camera is looking at;

c) The PC transfers the identified object and or its metadata to the mobile phone using the appropriate transfer channel (Bluetooth, WiFi, USB cable, cellular network or other).

d) The mobile phone identifies the object type and stores/displays/run/etc it using the appropriate application.

In one embodiment invention exploits the ability of the PC to "understand" where the user aims the mobile phone's camera, using a marker-based solution (image processing). In such a solution the PC displays a pre defined image (marker) on the screen and the camera of the mobile device captures it. The marker is chosen in such a way that it is easy to use known image processing algorithms (such as barcode reading) to understand the location the phone's camera captured. Alternative ways for the PC to understand the coordinates of the object at which the camera is aiming can be provided by the skilled person, for instance by sending the phone's camera view image to the pc and using image processing algorithms such as SURF algorithm [Herbert Bay, Andreas Ess, Tinne Tuytelaars, Luc Van Gool, "SURF: Speeded Up Robust Features", Computer Vision and Image Understanding (CVIU), Vol. 110, No. 3, pp. 346-359] or other, to register it in the desktop image or vice versa. Another alternative is using a camera coupled with the PC to identify the movements of the mobile device, or by using three-dimensional location information of the mobile device relative to the PC screen.

In another embodiment of the invention the pointing coordinates are calculated in real time. In such case there is a benefit to displaying augmented metadata on the objects in mobile preview (for example a file size or highlight around the chosen object). When the user chooses to interact with the object he will initiate the process (for example by pressing a key or touch screen).

Figure 1:
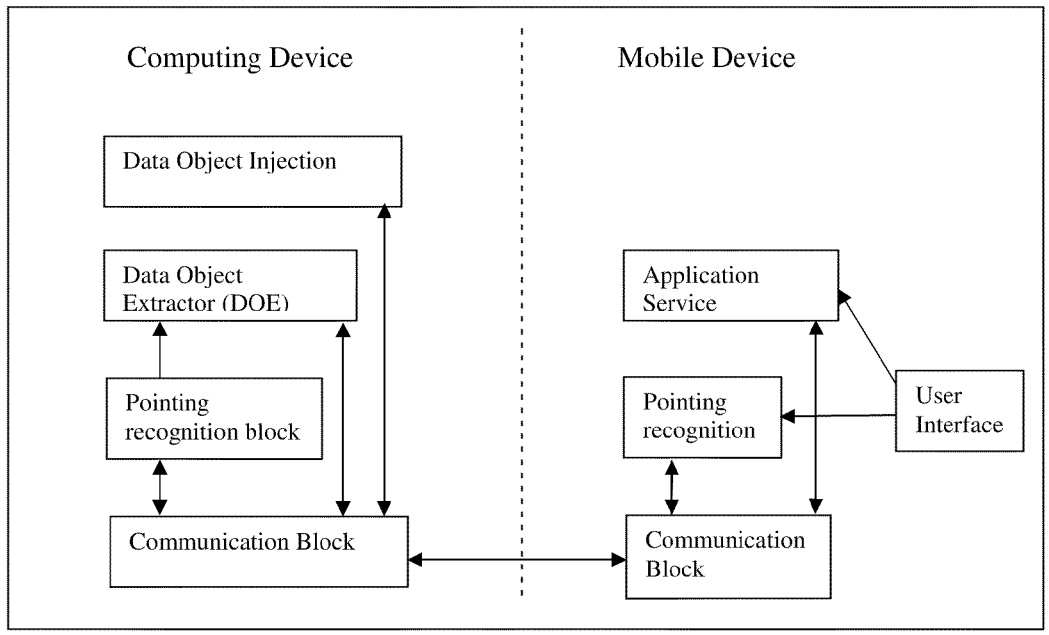
FIG. 1 is a schematic illustration of the main blocks of the system of the invention.

FIG. 1 schematically shows the main blocks of a system according to the invention. In this system a mobile phone is in communication with a PC via any suitable communication channel, including but not limited to Bluetooth, WiFi, USB cable or cellular network. The PC is equipped with a Data Object Extractor (DOE) the role of which is to handle the data object and/or its metadata to be transferred to the mobile phone, once its coordinates have been determined and supplied to it. The DOE consists of a software service running on the PC, or part of the OS of the PC.

The mobile device is provided with an image processing module and with an application service (AS), the role of which will be explained below. The image processing module acquires from the camera an optical image from the PC screen which includes the embedded marker and calculates the coordinates of the image at which the user has pointed the camera, and transmits said coordinates to the PC. The DOE uses the coordinates transmitted to it by the mobile phone to identify the data object selected by the user and to extract it into a transmissible form. The transmissible form used depends, of course, on that type of data object; for instance, for an image appearing on webpage the original image file is taken. If a text field is selected its content will be taken as a textual data.

The data file or object extracted according to the above is then transmitted to the mobile device via the communication line and is received by the AS, which makes it available to the appropriate mobile application.

As will be apparent to the skilled person some steps can be performed differently, such as the identification of the coordinates of the object selected by the user on the PC screen can be carried out in the PC itself, rather than on the mobile device, by providing to it an image acquired by the mobile device, which includes sufficient information for this purpose. Alternatively, a combination of mobile and PC image processing may be employed.

Figure 2:
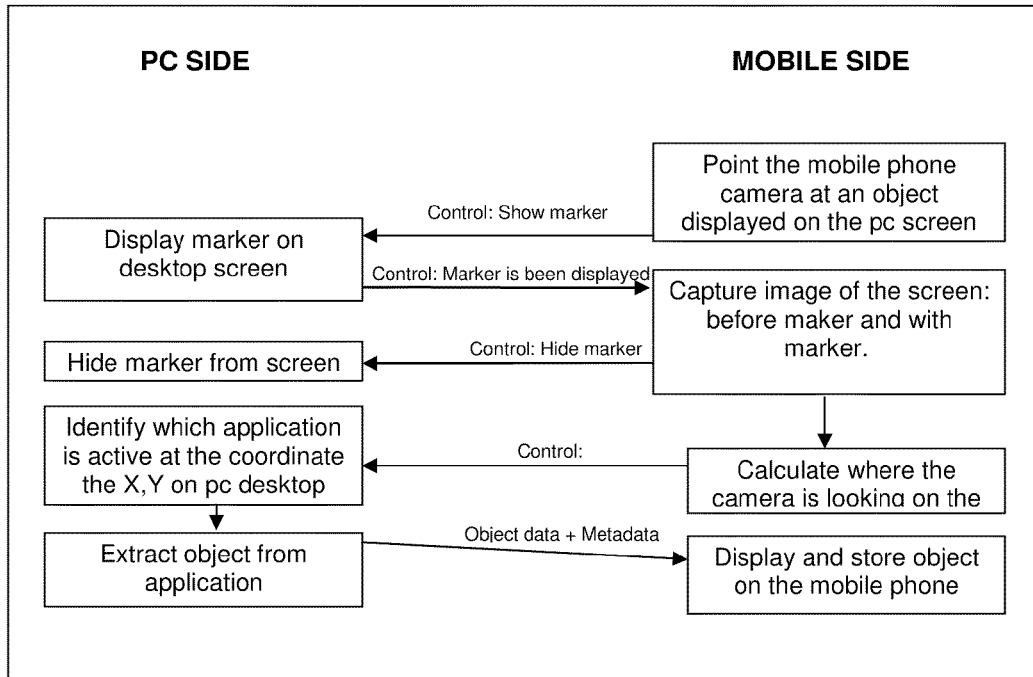
FIG. 2 illustrates a technical sequence performed by a system according to one particular exemplary embodiment of the invention.

Turning now to FIG. 2, and exemplary sequence of operation of the system of FIG. 1 is schematically illustrated. The sequence involves pointing the camera of a mobile device (and this particular example, a mobile phone) at an object which is displayed on the PC screen. A key in the mobile device is predefined to activate the following steps. In the following steps the phone takes a picture of the pc screen and then sends a command to the PC to display the marker. The PC displays the marker and notifies the phone. The phone then takes an additional picture, this time containing the marker. The phone image processing module uses the two pictures to calculate the coordinates (see detailed description in FIG. 4-7). Once the coordinates were identified by the phone they are sent to the PC. The DOE identifies which object is shown on the screen at the coordinates that have been determined and extracts the object from the application, which is then transmitted to the mobile device for further use.

Figure 3:
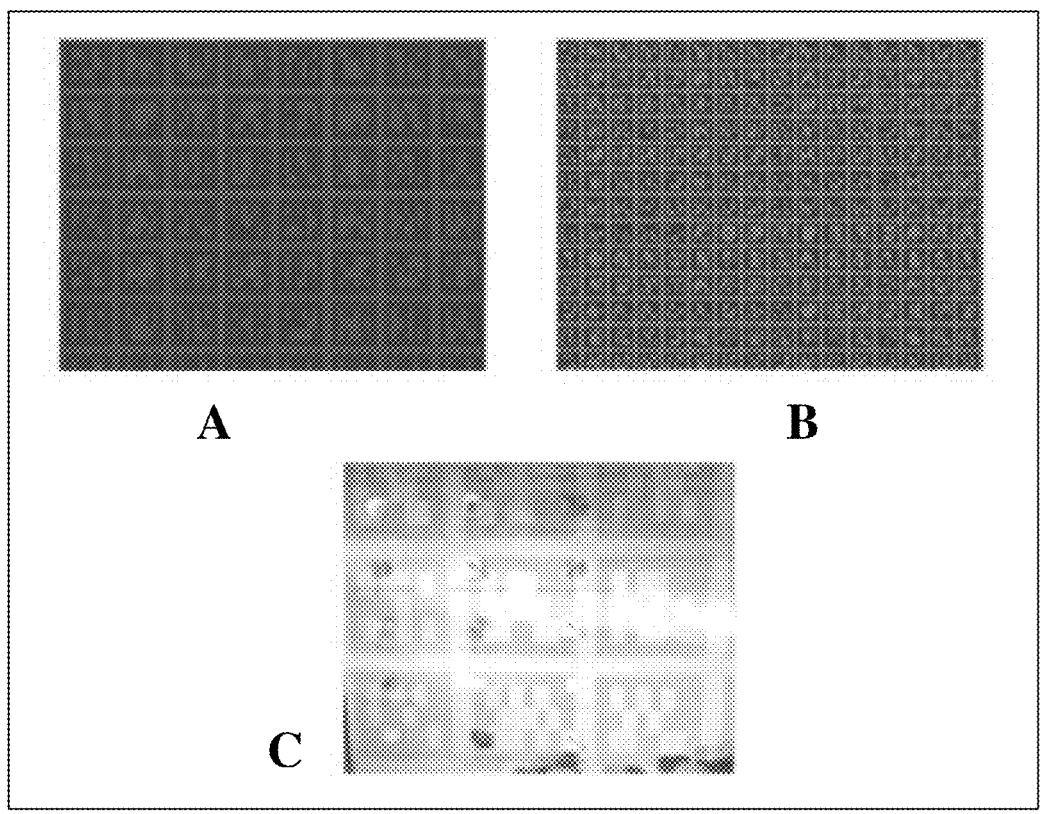
FIG. 3 shows three different examples of markers used to illustrate one embodiment of the invention.

FIG. 3 shows three illustrative different types of markers. Marker A includes black and blue indicia (blue being the light color in the black-and-white figure), marker B includes black and red indicia (red being the light color in the black-and-white figure). Note that by using different sizes of markers (the blue one has bigger elements than the red) image processing will be successful in different distances from the PC screen. The actual marker which is displayed on the PC screen will be a mix of red and blue and it will be split again to its red and blue components after it was captured by the phone camera side. Marker C is a blend of a marker with the desktop image captured by the camera. Blending of the marker in the current active desktop makes it less visible and irritating to the viewer. Other methods of making the marker less visible are discussed at [Anselm Grundhofer, Manja Seeger, Ferry Hantsch, and Oliver Bimber, Bauhaus-University Weimar, "Dynamic Adaptation of Projected Imperceptible Codes"].

Figure 4:
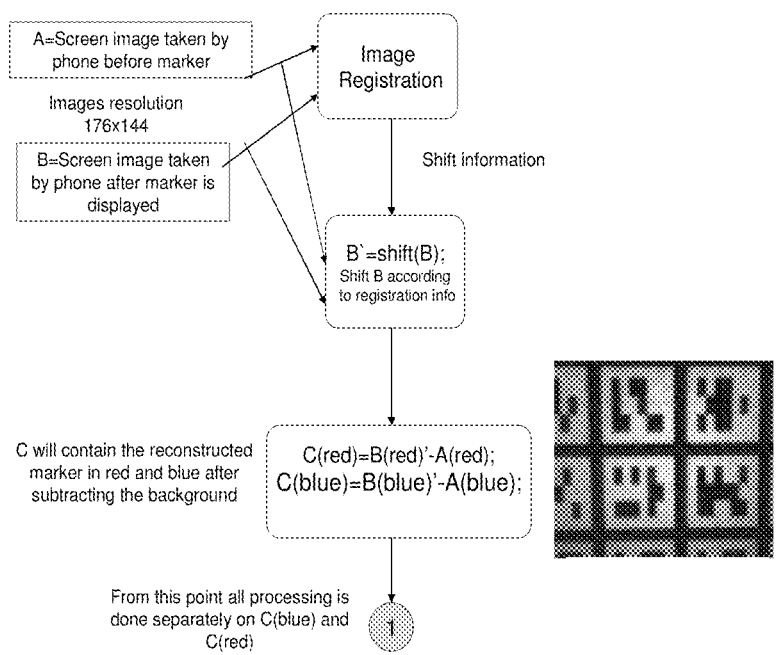
FIGS. 4-7 illustrate a specific example of one method according to the invention for identifying in the mobile device the location on a PC screen at which the camera of the mobile device is pointing.
Figure 5:
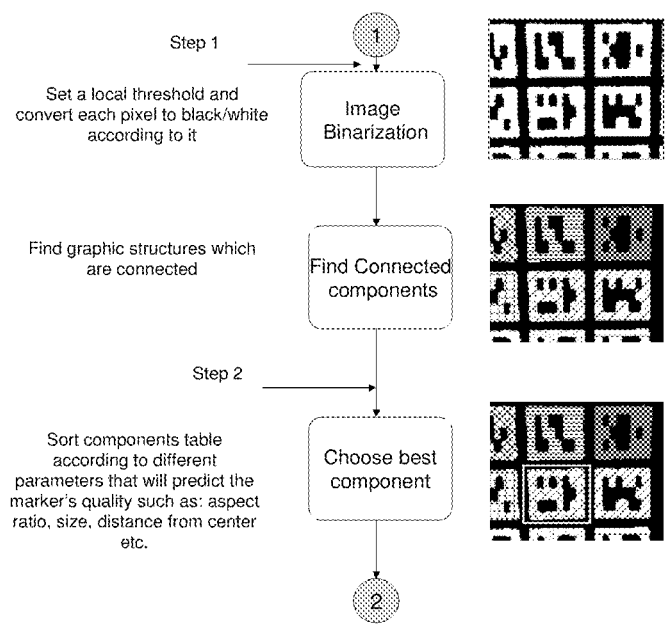
Figure 6:
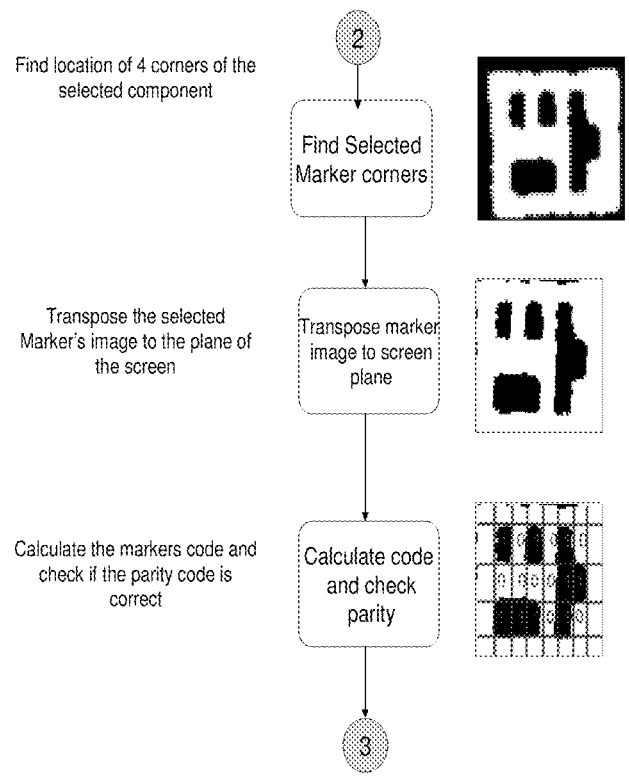
Figure 7:
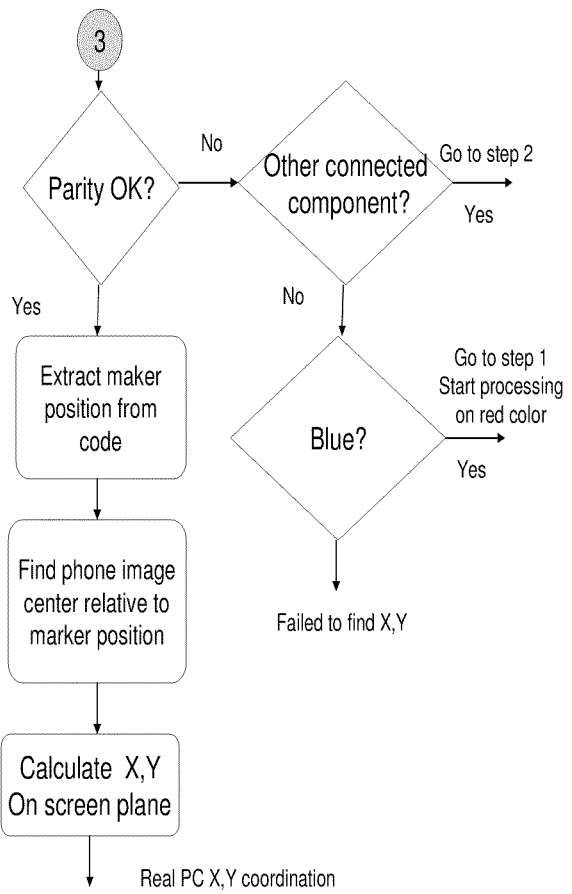

FIG. 4 through 7 illustrate a process according to an embodiment of the invention, for identifying the real, X,Y coordinates of an object on the PC screen, at which the user of a mobile device has pointed his camera. FIG. 4 illustrates the process of capturing two images using a cellular phone. The first image (A) is before the PC places the marker on the screen and the second image (B) contains the marker. We then calculate the shift between the two frames (this shift is a result of hand movements) and align image B to match A. This results in image B'. Subtraction of the two images (A and B) provides an image of the marker without the desktop background (C). Further more, we then get the red component of the image(C(red)) and blue component (C(blue)). FIG. 5 shows how a specific pattern inside the marker images received is recognized. First a local threshold filter is run in order to create a binary image. Then the connected components are identified and the best component is chosen to match the marker pattern characteristics (aspect ratio, size etc.). In FIG. 6 the pattern's code is read to attempt to determine its authenticity. First the markers corners are identified and the image is transposed to be exactly square and in the size it was originally displayed on screen. Then the patterns code is calculated and validated using an error detection/correction algorithm. If it is not a valid code, the next best fitting pattern is chosen and step 2 is repeated. If the code is valid the process proceeds. In FIG. 7 the marker's position is extracted according to the code it represents. Then its position relative to the phones screen center (the point where the user was aiming at) is found and is sent to the PC.

Figure 8:
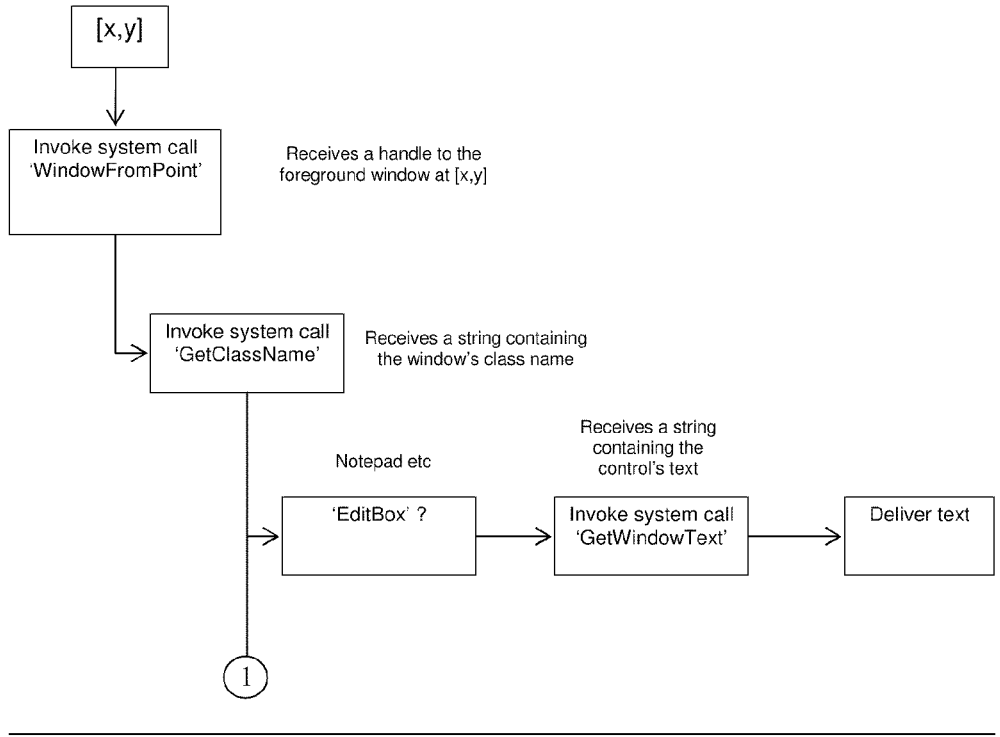
FIGS. 8-10 illustrate a specific example of one method according to the invention by which a PC extracts an object located at the specified coordinates on its screen, which have been calculated by the mobile device.
Figure 9:
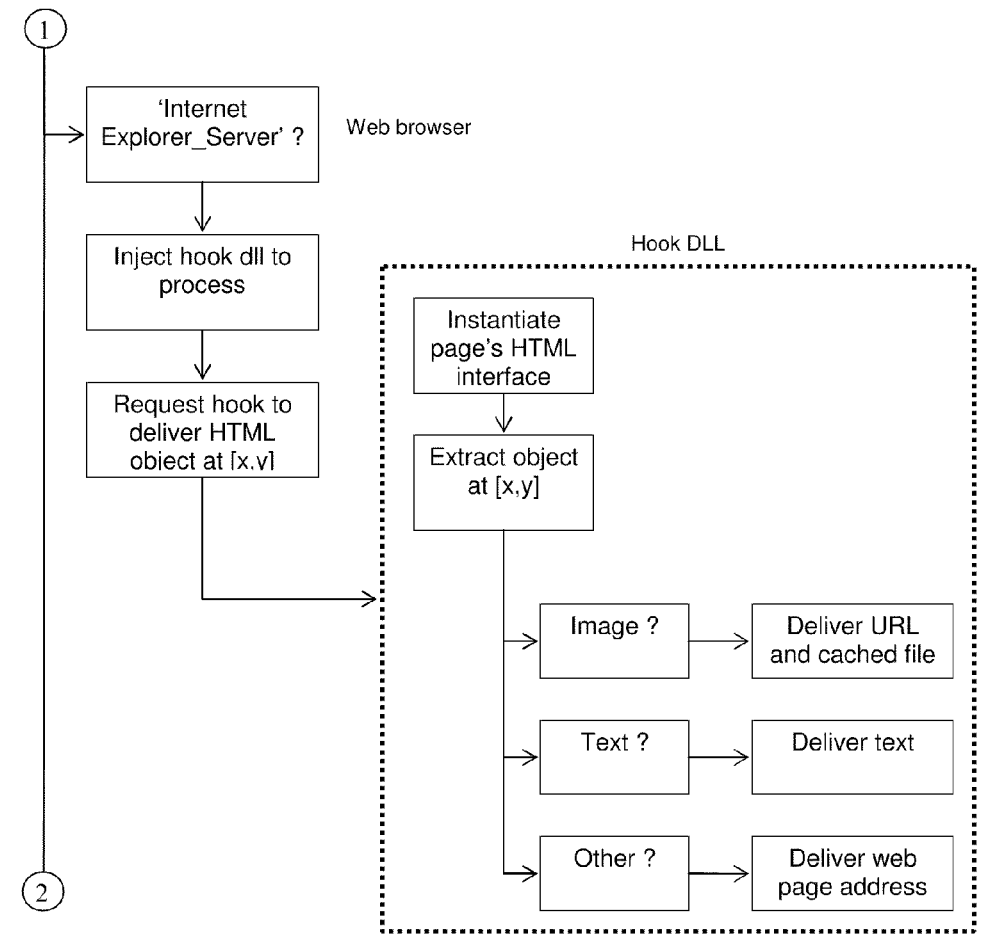
Figure 10:
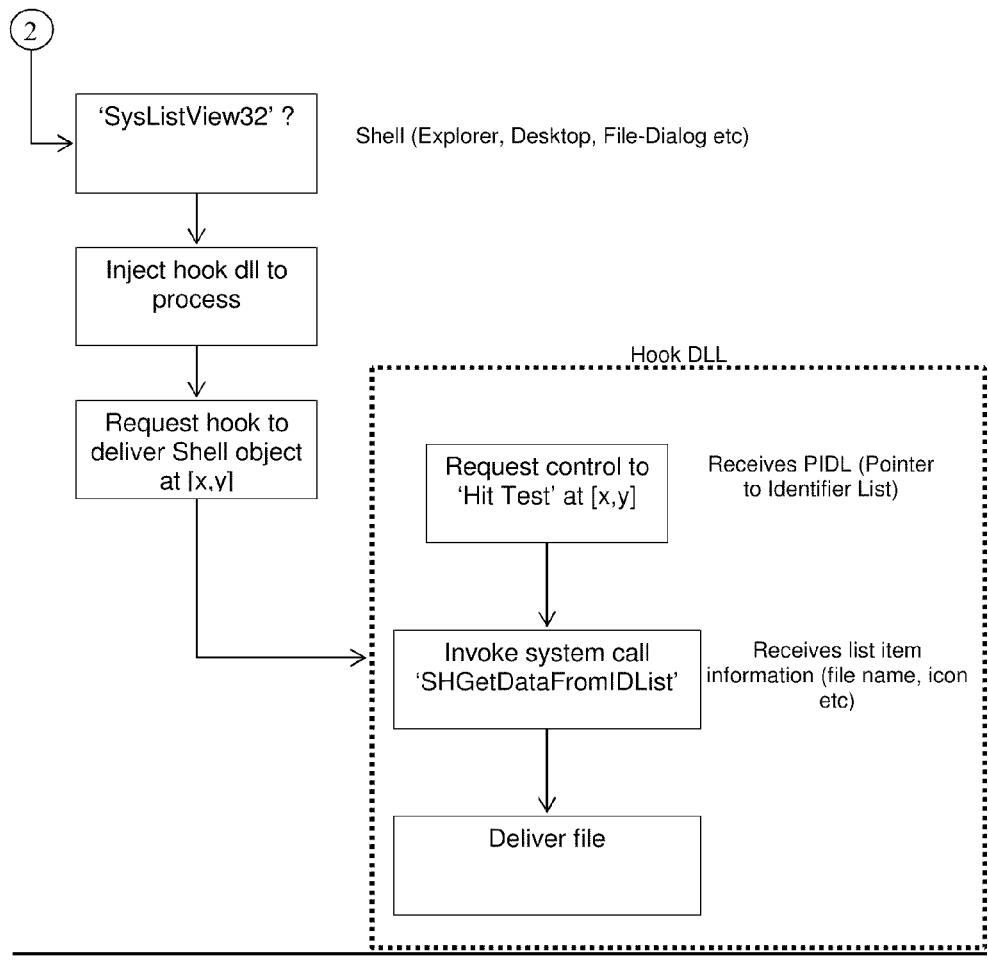

FIGS. 8 through 10 illustrate one example of extraction of an object located at the coordinates on the PC screen that have been calculated by the mobile phone when using Windows XP operating system on PC.

Figure 11:
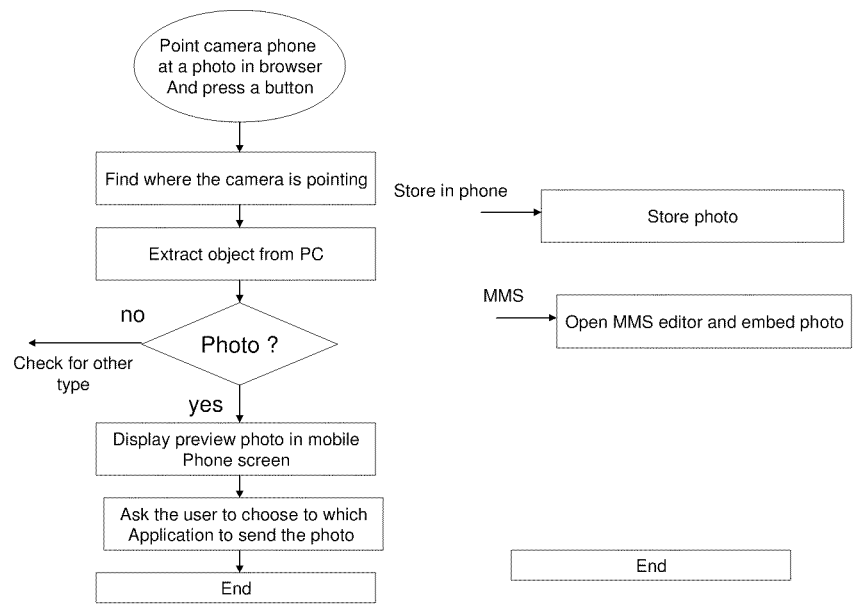
FIG. 11 is an example of use in which an image is acquired from a browser.

FIG. 11 illustrates the acquisition by a mobile device of a photo found in a browser open on the PC screen. The steps illustrated in the figure are self-explanatory and, therefore, they are not further described herein, for the sake of brevity.

Figure 12:
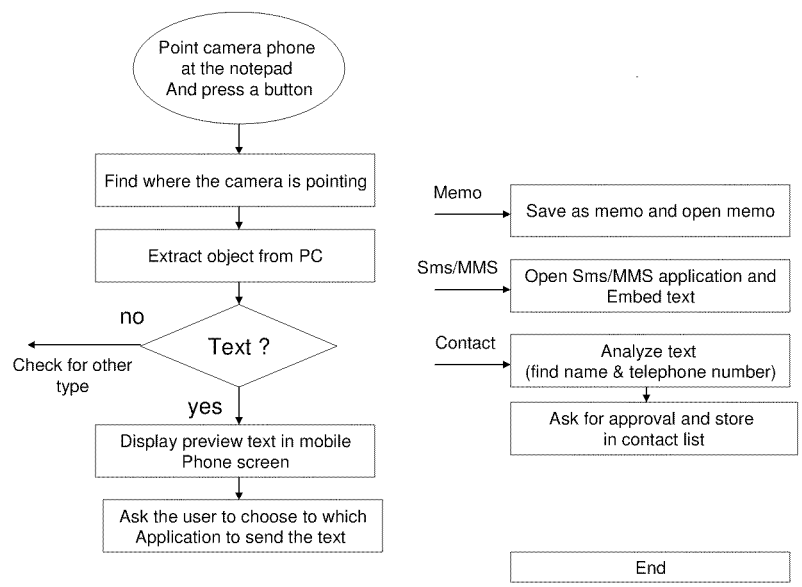
FIG. 12 is an example of use in which text is acquired from a notepad.

FIG. 12 illustrates the acquisition by a mobile device of text from a notepad shown on the PC screen. The steps illustrated in the figure are self-explanatory and, therefore, they are not further described herein, for the sake of brevity.

Figure 13:
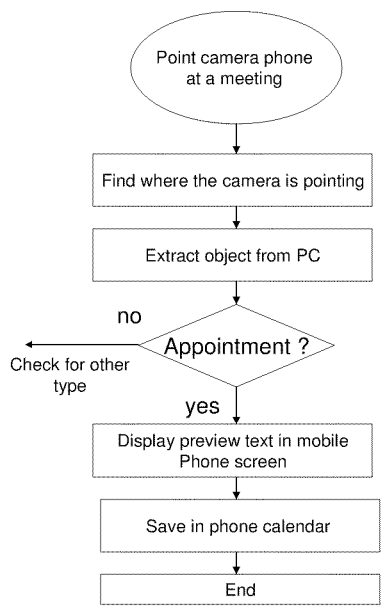
FIG. 13 is an example of use in which details of a meeting are acquired from a calendar.

FIG. 13 illustrates the acquisition by a mobile device of calendar data relating to a meeting which is shown in a calendar display on the PC screen. The steps illustrated in the figure are self-explanatory and, therefore, they are not further described herein, for the sake of brevity.

Figure 14:
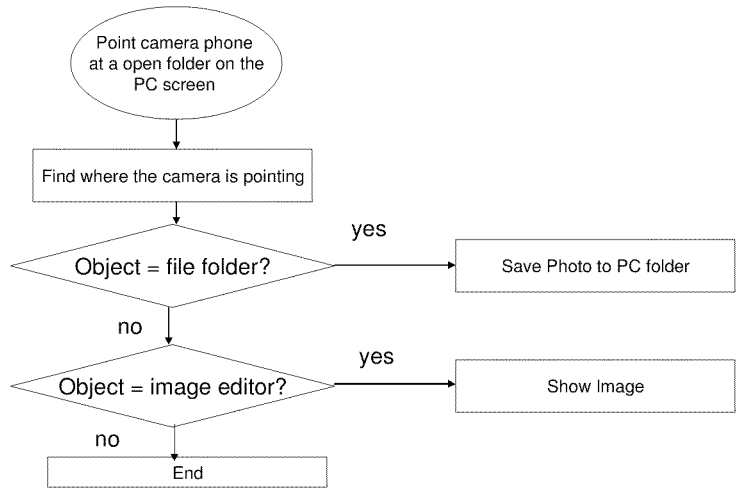
FIG. 14 is an example of use in which an image is "pushed" from a mobile device to a PC.

FIG. 14 illustrates the pushing of a photo by a mobile device to the PC data storage or to a PC viewer application. The user first chooses on the mobile side the object (in the example, a picture) that he wants to push to the computer. He then points the device to the location on the PC screen to which he wishes to push the object. It can be an open folder or an open viewer application which supports the file type that was selected for pushing (merely as an example, FIG. 14 makes reference to an open folder). Then the user presses the mobile device "action" button and the push process begins. In the first step the mobile device and PC "understand" where the phone was aiming to. Then, the PC understands which object is currently presented on the screen at that point. If it's an open folder it will copy the file to this folder and if it's a viewing application it will copy the file to a temporary directory and open it inside the application.

Figure 15:
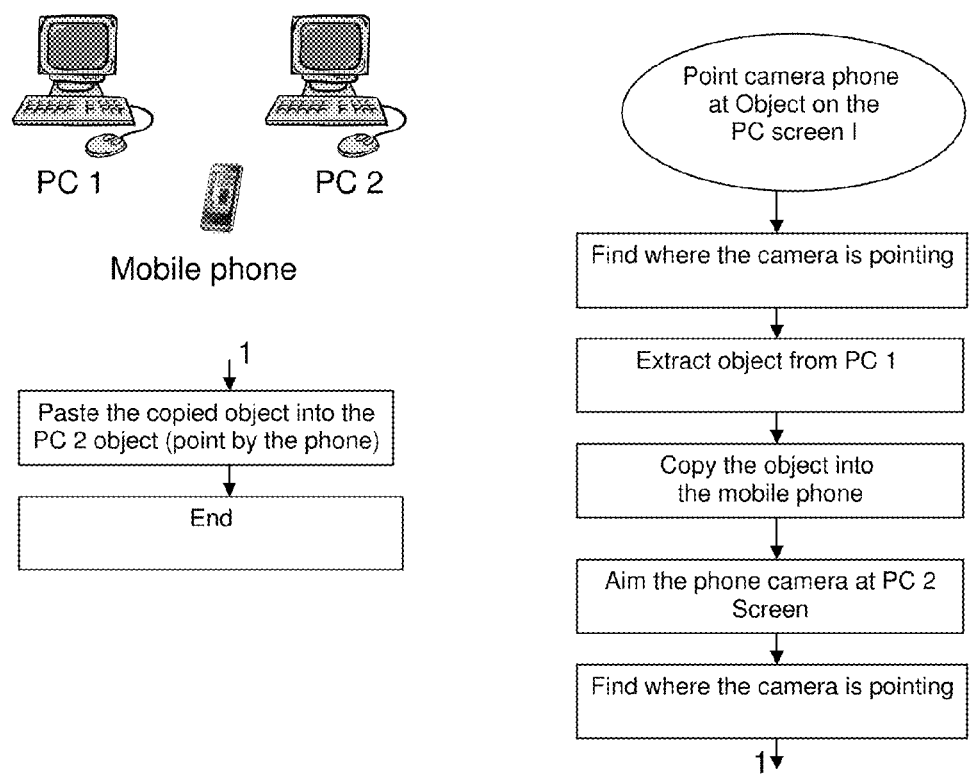
FIG. 15 is an example of use in which a mobile device interacts with two PCs.

FIG. 15 illustrates another embodiment of the invention in which the mobile device is used as a bridge between two separate PCs. In this mode, and as clearly shown in the figure, the mobile device first acquires an object from PC 1, and then pushes it to PC 2. In this way the mobile device becomes a data transfer apparatus between different PCs ("Universal clipboard").

In an alternative embodiment of the invention the identification process of an object on the PC screen, which is to be transferred to a mobile device, (or a location on the PC screen to which an object is to be pushed) is identified by using a pointing device and directly pointing at the desired object or location. Any suitable pointing device can be used, such as a mouse or a finger, if a touch screen is used, with or without the additional use of a keyboard key, a mouse button click or other input device. As will be appreciated by the skilled person, using a pointing device simplifies the location and identification process and, therefore, may be desirable in some instances.

The following additional examples will further illustrate the invention.

Example 1

Taking a Picture from Internet Explorer to Phone

Figure 16:
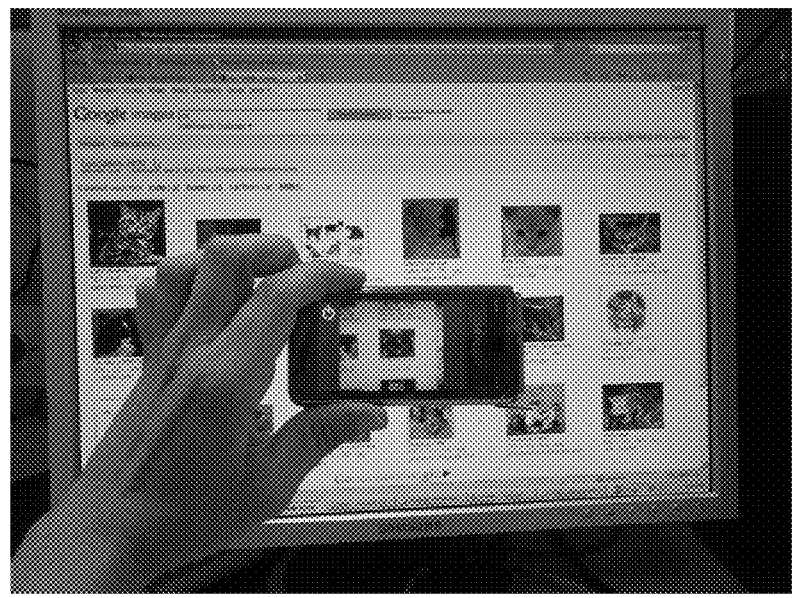
FIGS. 16 (A and B) illustrates the operation of the invention when taking a picture from the Internet Explorer browser and transferring it to a mobile phone.
Figure 16:
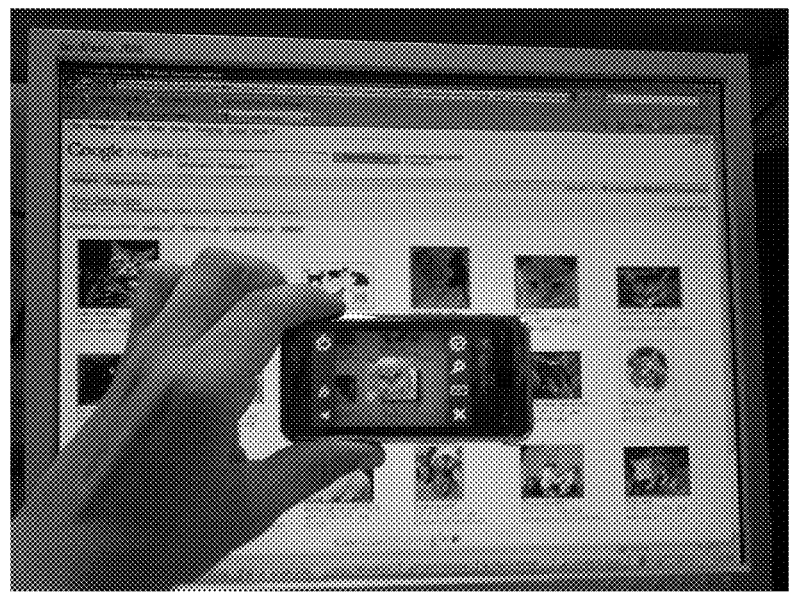

The following describes in detail the process of transferring a picture shown on the PC screen in Internet Explorer to the phone, with reference to FIG. 16 (A. and B). First of all the user activates the application. He sees a preview of the phones camera capture including a crosshair in the screen center. When the crosshair is aimed on the picture to be transferred (FIG. 16A)

He presses the phone's action button. The process described in FIGS. 2-8 starts and yields the coordination of the crosshair on the PC screen. The coordination is sent to the PC where the data object extraction process starts (described in FIGS. 8-10). First the 'WindowFromPoint' system call is invoked which returns a handle to the internet explorer window. Then the 'GetClassName' system call is invoked using this handle to get a string describing the window's class name (Internet Explorer_Server in this example). The software injects a hook dll to the process and then sends a request to that hook to deliver the HTML object at the location found by the phone. The hook dll extracts the object in this position (a picture in this example) and returns a picture URL and the cached image file. The file is then sent to the phone side and invokes the user interface to allow various operations on the picture (FIG. 16B) such as sending as MMS, opening in the default phone browser, etc.

Example 2

Taking a Selected Text Out of Notepad to Phone

Figure 17:
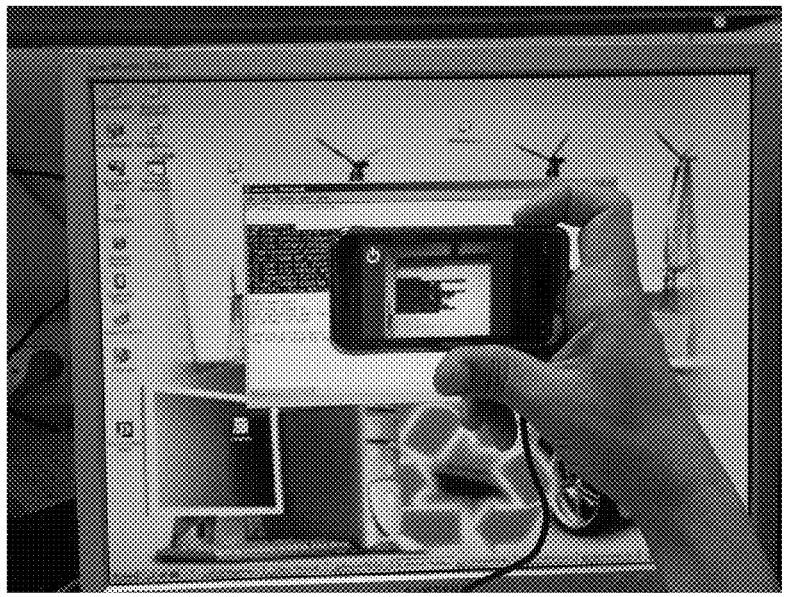
FIGS. 17 (A and B) illustrates the operation of the invention when transferring selected text from a PC notepad to a cellular phone.
Figure 17:

The following describes in detail the process of transferring selected text in the notepad application, with reference to FIGS. 17 (A and B). First of all the user opens a notepad document in which he selects a specific text he wants to transfer. Then, the user activates the application. He sees a preview of the phone camera capture including a crosshair in the screen center. When the crosshair is aimed at the notepad application (FIG. 17A) he presses the phone's action button. The process described in FIGS. 2-8 starts and yields the coordination of the crosshair on the PC screen. The coordination is sent to the PC where the data mining process starts (described in FIGS. 8-10). First the 'WindowFromPoint' system call is invoked which returns a handle to the notepad window. Then the 'GetClassName' system call is invoked using this handle to get a string describing the window's class name ('EditBox' in this example). The software invokes the 'GetWindowText' system call and gets the selected text. A text file is created from the received text and the file is then sent to the phone side. The phone software receives the file and invokes the appropriate user interface to allow various operations on the text (FIG. 17B) such as send as SMS, open in Notes application etc.

Example 3

Transferring a Music File (mp3) from Windows File Explorer to a Cellular Phone

Figure 18:
FIGS. 18 (A and B) illustrates the operation of the invention when transferring an MP3 music file from the Windows file Explorer to a cellular phone.
Figure 18:
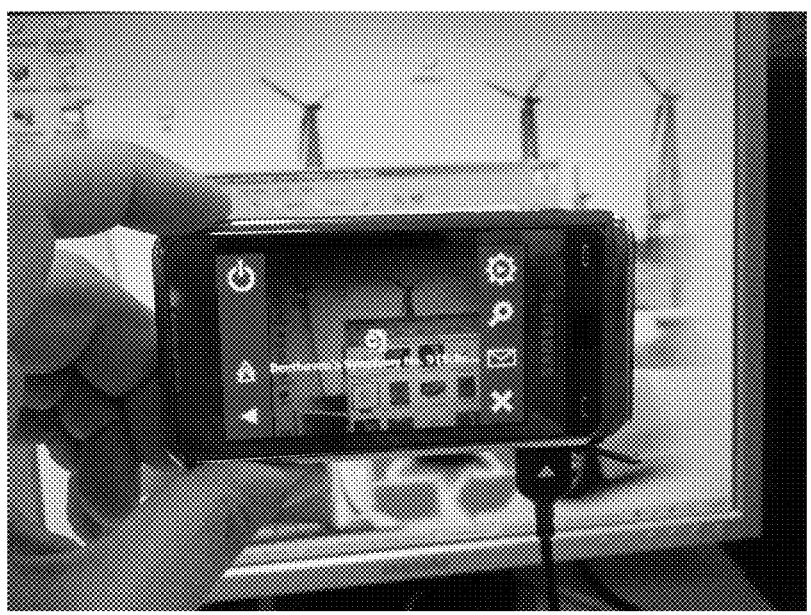

The following describes in detail the process of transferring an mp3 music file from Windows file Explorer. First of all the user opens directory containing the mp3 file in File Explorer. Then, the user activates the application. He sees a preview of the phone camera capture including a crosshair in the screen center. When the crosshair is aimed at the desired music file (FIG. 18A) he presses the phone's action button.

The process described in FIGS. 2-8 starts and yields the coordination of the crosshair on the PC screen. The coordination is sent to the PC where the data mining process starts (described in FIGS. 8-10). First the 'WindowFromPoint' system call is invoked which returns a handle to the file explorer window. Then the 'GetClassName' system call is invoked using this handle to get a string describing the window's class name ('SysListView32' in our case). The software injects a hook dll to the process and then sends a request to that hook to deliver shell object at location found by the phone. The hook dll extract the PIDL (pointer to identifier list) in this position and invokes the 'SHGetDataFromDList' system call to get the item information on the file (filename, icon etc). The information is used to locate the file and to send it to the phone. The phone software receives the file and invokes the appropriate user interface to allow various operations on the file (FIG. 18B) such as opening in the default browser etc.

Example 4

Transferring a Picture from a Mobile Phone to a PC File Explorer

The following describes in detail the process of transferring a picture from the a mobile phone to Windows file Explorer. First of all the user uses the phone application to select an image to be transferred. Then, the user activates the push operation from the software's GUI. He sees a preview of the phones camera capture including a crosshair in the screen center. When the crosshair is aimed at the desired PC file explorer window (FIG. 19A) he presses the phone's action button.

The process described in FIGS. 2-8 starts and yields the coordination of the crosshair on the PC screen. The coordination is sent to the PC where the data mining process starts (described in FIGS. 8-10). First the 'WindowFromPoint' system call is invoked which returns a handle to the File Explorer window. Then the 'GetClassName' system call is invoked using this handle to get a string describing the window's class name ('SysListView32' in our case). It then sends a response to the phone telling whether the object which had been identified (a folder in our case) is an eligible target to support the "push" operation according to the pushed object type (an image file in this example).

Figure 19:
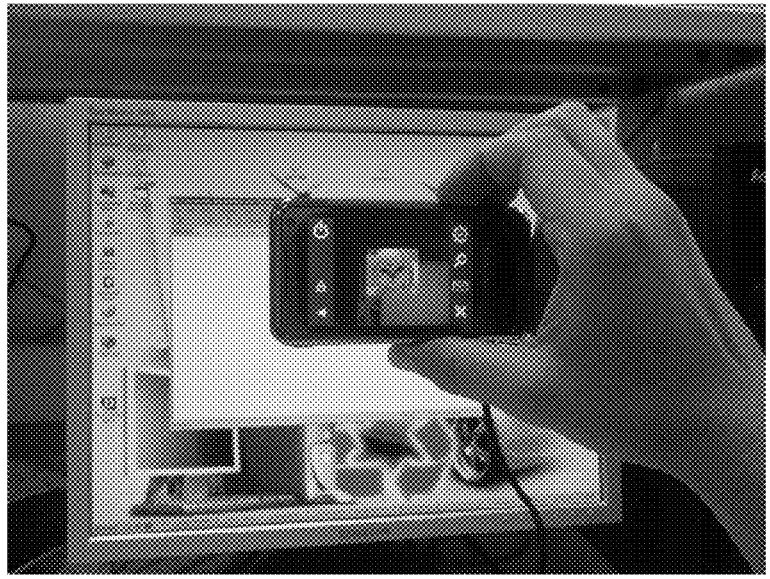
FIGS. 19 (A and B) illustrates the operation of the invention when transferring a picture from a cellular phone by pushing it to a PC File Explorer.
Figure 19:

The phone then sends the picture file from the phone to the PC software (FIG. 19B). The PC software writes the file to the system temporary files folder and moving it to the target location, determined by using the 'GetWindowText' system call which indicates the folder path (except in cases of special folders such 'Desktop', 'My Documents' etc which are handled using 'SHGetSpecialFolderPath' system call.

Example 4

Transferring a Picture from a Phone to a PC as an Attachment of an Outlook Outgoing Email Message The following describes in detail the process of transferring a picture from the phone to an attachment of an Outlook outgoing email message. First of all the user opens a new or existing outgoing Outlook email message. The user then uses the phone software to select an image to be transferred. Then, the user activates the push operation from the software's GUI. He sees a preview of the phones camera capture including a crosshair in the screen center. When the crosshair is aimed on the opened outlook message window in the PC (FIG. 20A) he presses the phone's action button.

Figure 20:
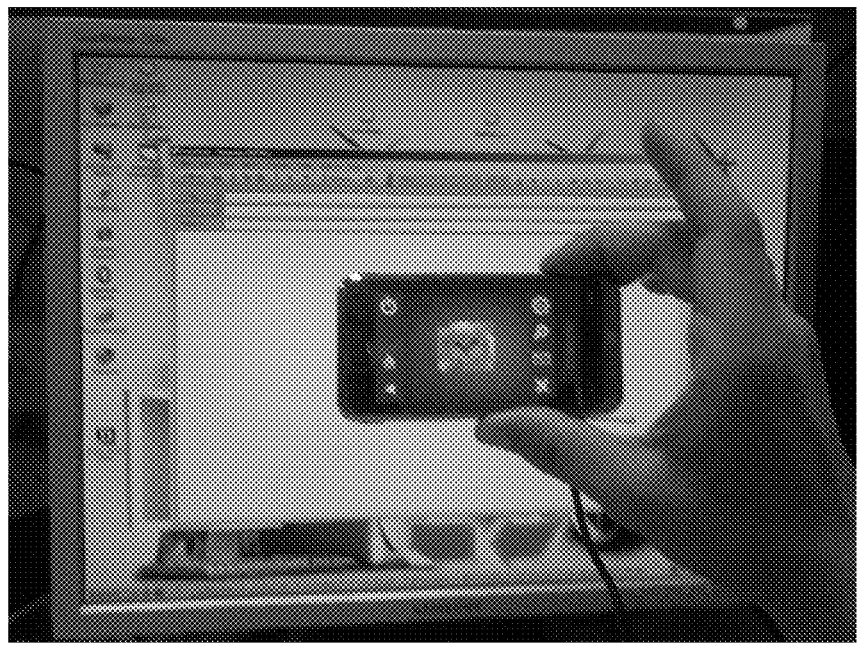
FIGS. 20 (A and B) illustrates the operation of the invention when transferring a picture from a cellular phone by pushing it to a PC to become an attachment of an Outlook outgoing e-mail message.
Figure 20:
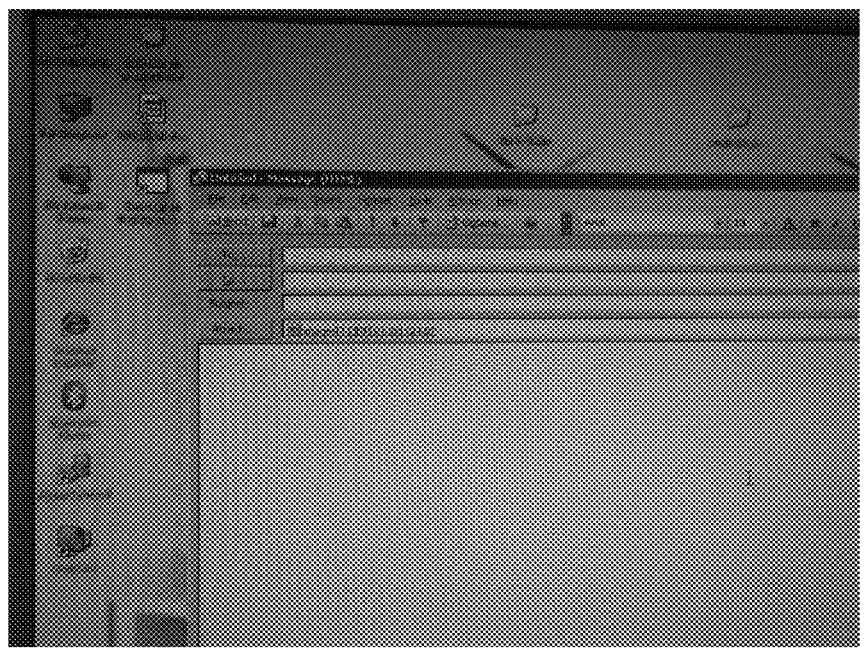

The process described in FIGS. 2-8 starts and yields the coordination of the crosshair on the PC screen. The coordination is sent to the PC where the data mining process starts (described in FIGS. 8-10). First the 'WindowFromPoint' system call is invoked which returns a handle to a component in Outlook new message dialog. Then the 'GetClassName' system call is invoked using this handle to get a string describing the component's class name. The string is then compared to a list of possible values related to Outlook new message dialog (which is different for different versions and different viewtypes). A process of getting the previous component parent handle and retrieving its class name is initiated until there is a match or until a 'parentless' handle is obtained. If a match is found, the mobile is notified and the object is sent to the PC. Then, using COM objects, an object representing the Outlook application is generated to access the new message dialog "message components" (subject, body etc), and the file path of the object which had been sent is added to the message attachments (FIG. 20B).

Example 5

Direct Installation of a Phone Software in a Mobile Phone from a Web Application Store The following describes in detail the process of installing a phone software just by pointing and clicking on its web page or icon in a web application store. First of all the user opens a web browser and goes to an application store. Then, the user activates the application. He sees a preview of the phones camera capture including a crosshair in the screen center. When the crosshair is aimed at the desired application (which can be a screenshot or text describing it—FIG. 21A) he presses the phone's action button.

Figure 21:
FIGS. 21 (A and B) illustrates the direct installation of a phone software in the cellular phone, from a web application store.
Figure 21:

The process described in FIGS. 2-8 starts and yields the coordination of the crosshair on the PC screen. The coordination is sent to the PC where the data mining process starts (described in FIGS. 8-10). First the 'WindowFromPoint' system call is invoked which returns a handle to the Internet Explorer window. Then the 'GetClassName' system call is invoked using this handle to get a string describing the window's class name (Internet Explorer_Server in this example). The software injects a hook dll to the process and then sends a request to that hook to deliver an HTML object at location found by the phone. The hook dll extracts the object in this position (a picture in this example) and returns a picture URL. The data object extractor identifies that the image object contains an HTML URL reference (e.g. <img src="TennisGame.jpg" href=http://uk.samsungmobile.com/games/TennisGame.jad/>) to an application installation file, and uses the URL data to download the installation file from the web. The file is then sent to the phone. The phone software receives the file and invokes the appropriate user interface to allow the installation (among various operations) to take place (FIG. 21B).

As will be apparent to the skilled person, the invention allows performing many activities that were not visibly carried out by conventional methods known in the art. An illustrative list of uses of the invention, provided for illustration only and not intended to limit such uses in any way, is as follows:
 1. PC to phone—file transfer
    a. Transfer of photos from PC→Phone (as wallpaper)
    b. Files
 2. Outlook:
    a. Contact Sync (specific or all)
    b. Calendar Sync (specific or today)
    c. Point at mail folder ask to bring all, unread, today etc
 3. Phone to phone—Transfer data between phones
 4. Video (PC→phone): pointing on flash video player
    a. Send URL to phone
    b. Convert stream to file and send to phone
    c. Stream to phone from PC (local, over cell phone network)
 5. Text (notepad, word)
    a. Easy and fast to write SMS
    b. Text→contacts
    c. Write address in plain text→Mobile Navigation Application
 6. Transfer of files PC→(mobile)>PC examples:
    a. Office<->home (students)
    b. School<->home
    c. Work computer<->presentation computer
 7. Point at maps and send coordination to navigation application on the mobile phone. Easy to setup destination
 8. Music server Point at a song
    a. Copy play list (private or public place—cafe) and enable to buy
    b. Upload songs to internet server
    c. Instead of direct copy PC will stream selected song to mobile
 9. Application store—point at an application and install in phone (one click)
 10. In selected search engine point the phone on preview image and bring the original image
 11. Backup my SMSs
 12. Point the phone at news and receive updates from the same feed or subject (e.g. gossip)
 13. Non-PC
    a. Fastfood—point the phone on the teller screen to pass information about my phone number-when the food is ready receive SMS
    b. Bulleting board—copy/post the ads to the mobile phone
 14. Business card exchange between one mobile phone to the other.

All the above description has been given for the purpose of illustration and is not meant to limit the invention in any way, except as defined in the claims to follow.

The invention claimed is:

1. Method for transferring in digital form a selected object or meta data thereof appearing on a screen of a computing device to a mobile device which is provided with a camera, which comprises the steps of:
   a. activating the camera of the mobile device and pointing a crosshair of the camera to the location of said object on the computing device screen;
   b. sending a message from the mobile device to the computing device to temporarily issue visible coordinate markers on the screen of the computing device;
   c. capturing by said camera an image of said markers, and image processing the captured image to determine from the markers that appear at the location of camera crosshair those coordinates on the computing device screen that correspond to the location of said object;
   d. given said object coordinates at the computing device, identifying by the computing device the object appearing at said determined screen coordinates, and transferring the object or metadata thereof to the mobile device.

2. The method according to claim 1, wherein said image processing is performed at the mobile device, which in turn conveys the object coordinates to the computing device.

3. The method according to claim 1, wherein said image processing is performed at the mobile device, which conveys the object coordinates to the computing device.

4. The method according to claim 1, wherein said coordinate markers combine two or more colors, to enable determination of the coordinates in a range of distances between the camera and the computing device screen.

5. The method according to claim 1, wherein the mobile device transfers said captured image of the markers to the computing device, which in turn performs said image processing to determine the object appearing at said screen coordinates.

6. The method according to claim 1, wherein the object is a software file.

7. The method according to claim 1, wherein the object is a piece of data which is displayed on the screen of the computing device by a program running at the computing device.

8. The method according to claim 7, wherein said piece of data is a text-oriented data, marked by a user of the computing device.

9. The method according to claim 1, wherein a communication between said computing device and said mobile device is performed by means of a wireless technology standard for exchanging data over short distances or Wi-Fi communication.

10. Method for transferring a selected object from a mobile device provided with a camera to a specific location within a screen of a computing device, which comprises the steps of:
  e. activating the camera of the mobile device and pointing a crosshair of the camera to the location of said object on the computing device screen;
  f. sending a message from the mobile device to the computing device causing it to temporarily issue one or more visible coordinate markers on the screen of the computing device;
  g. capturing by said camera an image of said markers, and image processing the captured image to determine from the markers that appear at the location of camera crosshair those coordinates on the computing device screen that correspond to the location of said crosshair;
  h. given said object coordinates at the mobile device, sending the object to the computing device, and saving by the computing device said object at a location that corresponds to the identified coordinates.

11. The method according to claim 10, wherein said image processing is performed at the mobile device, which conveys the coordinates on the computing device screen that relate to the location of said crosshair, as determined, to the computing device.

12. The method according to claim 10 wherein the object is a software file.

13. The method according to claim 10, wherein the object is a piece of data to be introduced into a program running at the computing device.

14. The method according to claim 13, wherein said piece of data is a text-oriented data, marked by a user of the computing device.

15. The method according to claim 10, wherein said coordinate markers combine two or more colors, to enable determination of the coordinates in a range of distances between the camera and the computing device screen.

16. The method according to claim 10, wherein a communication between said computing device and said mobile device is performed by means of a wireless technology standard for exchanging data over short distances or Wi-Fi communication.

* * * * *